(12) United States Patent
Bhatt et al.

(10) Patent No.: US 8,702,220 B2
(45) Date of Patent: Apr. 22, 2014

(54) INK SET WITH NEAR INFRARED DETECTION CAPABILITY AND METHOD OF USING THE SAME

(75) Inventors: Jayprakash Bhatt, Corvallis, OR (US); Erick B Kinas, Camas, WA (US); Tye Dodge, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 165 days.

(21) Appl. No.: 13/386,961

(22) PCT Filed: Jul. 31, 2009

(86) PCT No.: PCT/US2009/052489
§ 371 (c)(1),
(2), (4) Date: Jan. 25, 2012

(87) PCT Pub. No.: WO2011/014196
PCT Pub. Date: Feb. 3, 2011

(65) Prior Publication Data
US 2013/0070015 A1 Mar. 21, 2013

(51) Int. Cl.
*G01D 11/00* (2006.01)
*B41J 2/175* (2006.01)
*C09D 11/00* (2014.01)

(52) U.S. Cl.
CPC .............. *C09D 11/322* (2013.01); *C09D 11/30* (2013.01); *B41J 2/175* (2013.01)
USPC ........................................... 347/100; 347/85

(58) Field of Classification Search
CPC ........ G01D 11/00; C09D 11/30; C09D 11/40; C09D 11/101
USPC .......... 347/19, 100, 84, 85; 106/31.28, 31.59, 106/31.6
See application file for complete search history.

(56) References Cited

U.S. PATENT DOCUMENTS

| | | |
|---|---|---|
| 2003/0097961 A1 | 5/2003 | Yatake et al. |
| 2004/0253419 A1 | 12/2004 | Bleikolm et al. |
| 2005/0068392 A1 | 3/2005 | Silverbrook |
| 2007/0219292 A1 | 9/2007 | Ookubo et al. |
| 2007/0279466 A1 | 12/2007 | Kinas |
| 2007/0279468 A1 | 12/2007 | Kinas et al. |
| 2009/0117278 A1 | 5/2009 | Sadohara |
| 2010/0231663 A1 | 9/2010 | Takasaki |

FOREIGN PATENT DOCUMENTS

| | | |
|---|---|---|
| CN | 1685019 | 10/2005 |
| CN | 101374917 | 2/2009 |
| EP | 1911814 | 4/2008 |
| WO | WO-2004029163 | 4/2004 |

OTHER PUBLICATIONS

English Translation of CN Office Action dated Sep. 6, 2013 for counterpart patent application CN 200980160396.3.

*Primary Examiner* — An Do

(57) ABSTRACT

An ink set with near infrared detection capability is disclosed. The ink set includes a cyan ink including a cyan colorant, a magenta ink including a magenta colorant, and a yellow ink including a yellow colorant, each of the colorants having maximum light absorbance in the visible wavelength range of about 400 to 750 nm, wherein each of the cyan, magenta and yellow inks includes a near infrared (NIR) absorbing pigment, which is different in spectral absorption characteristic from the colorant and absorbs light in the wavelength range of about 750 to 1200 nm.

19 Claims, No Drawings

INK SET WITH NEAR INFRARED DETECTION CAPABILITY AND METHOD OF USING THE SAME

RELATED APPLICATIONS

The present application claims the priority under 35 U.S.C. 119(a)-(d) or (f) and under C.F.R. 1.55(a) of previous International Patent Application No. PCT/US2009/052489, filed Jul. 31, 2009,entitled "Ink Set with Near Infrared Detection Capability and Method of Using the Same", which application is incorporated herein by reference in its entirety.

BACKGROUND

Inkjet printers, such as thermal and piezo inkjet printers, provide an effective means of propelling inks onto various types of media including plain and coated paper. Specifically, a typical inkjet printhead has an array of precisely formed nozzles located on a nozzle plate and attached to an inkjet printhead substrate. The substrate incorporates an array of firing chambers that receive liquid ink (colorants dissolved or dispersed in a solvent) through fluid communication with one or more ink reservoirs. In certain printers, each chamber has a thin-film resistor located opposite the nozzle so ink can collect between the firing resistor and the nozzle. Upon energizing a particular resistor element, a droplet of ink is expelled through the nozzle toward a print medium.

The present disclosure generally relates to ink compositions that are suitable for inkjet printing, and more particularly, ink formulations for multicolor printing. The novel aspects and advantages of the present disclosure will become apparent from the following discussion.

DETAILED DESCRIPTION

For the purposes of promoting an understanding of the principles of the present disclosure, reference will now be made to the exemplary embodiments, and specific language will be used to describe the same. It will nevertheless be understood that no limitation of the scope of the present disclosure is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

As used herein, the term "inkjet inks" refers to inks that are suitable for inkjet printing. The term "ink set" refers to inks that are designed or selected to be used together in a common printer. All of the inks present in a common printer can be considered an ink set, or a few inks from a larger group on inks can be considered to be an ink set. For example, most color printers have cyan ink (C), magenta ink (M), and yellow ink (Y). An ink set of these three inks (CMY) may be referred to as a "CMY ink set," even if other inks may also be present in a common printer, e.g., black, pale cyan, pale magenta, colorless ink, other colors, etc. Thus, reference to a specific ink set, e.g., "CMY ink set," does not infer that other inks are not present.

Numerical values, such as ratios, concentrations, amounts, molecular sizes, etc., may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and subrange is explicitly recited. For example, a weight range of about 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

With these definitions in mind, the present disclosure is drawn to a novel ink set with near infrared detection capability and a method of inkjet printing using the same. This novel ink set includes a cyan ink including a cyan colorant, a magenta ink including a magenta colorant, and a yellow ink including a yellow colorant, wherein each of these three inks includes a near infrared (NIR) absorbing pigment, which is different in spectral absorption characteristic from each of the colorants, and absorbs light in the wavelength range of about 750 nm to 1200 nm.

As used herein, "liquid vehicle" is defined to include a liquid carrier or medium that is used to carry the colorants and the NIR absorbing pigments to a media substrate (e.g. paper). Liquid vehicles are well known in the art, and a wide variety of ink vehicles may be used in accordance with various embodiments of the present disclosure. Such ink vehicles may include a mixture of a variety of different agents, including without limitation, surfactants, solvents, co-solvents, buffers, biocides, viscosity modifiers, sequestering agents, stabilizing agents, and water. The liquid vehicle can also carry other additives such as polymers, UV curable materials, latexes, and/or plasticizers in some embodiments.

The term "colorant" as used herein includes dyes and pigments that have maximum absorbance in the visible wavelength range of about 400 nm to 750 nm, and have negligible absorption above 750 nm, thereby providing visible color. The term "maximum or peak absorbance" refers to the light wavelength where most absorbance occurs. Typically, a range of absorbance of at least 25 nm on either side of peak absorbance is present.

The term "NIR absorbing pigment" as used herein includes pigments that absorb light in the wavelength range of about 750 to 1200 nm. Thus, NIR absorbing pigments are virtually transparent to visible light in liquid ink compositions, particularly when present at a low concentration, e.g. less than 5 wt %, in a liquid vehicle. As such, the visible colors of the color inks having the NIR pigments are substantially the same as those of the same color inks without the NIR pigments. In addition, NIR absorbing pigments are insoluble in the liquid vehicles that carry the colorants, unlike NIR dyes, which are soluble in liquid vehicles. The NIR absorbing pigment is different in spectral absorption characteristic from each of the colorants in the ink set in that the spectral absorption curve of the NIR absorbing pigment is substantially different from the spectral absorption curves of the cyan, magenta and yellow colorants. Substantially different spectral absorption curves means that, in a predetermined range of wavelengths, the absorption peaks and minima are substantially different at the same wavelengths. The NIR pigment is present in a concentration ranging from about 0.001% to about 4.0% by weight, and in certain embodiments from about 0.001% to about 1.0%, based on the total weight of each color ink.

The NIR pigments that are useful for the purpose of the present disclosure belong to the Phthalocyanine and Naphthalocyanine class, with or without the presence of a central metal atom, that has absorbance in the 750-1200 nm wavelength range. As examples, suitable NIR pigments include, but not limited to, YKR-4010, YKR-3030, YKR-3070, MIR-379, MIR-369, YKR-3040, YKR5010, YKR-3081, MIR-362, and YKR-3080, available from Yamamoto Chemicals Co.

The NIR pigments are dispersed using suitable dispersants in aqueous liquid for inclusion into the ink.

It has been discovered that the dispersed NIR absorbing pigment described above is very stable chemically, i.e., it does not lose its strong near IR absorbance property (750-1200 nm), in aqueous inkjet inks over the life of the ink, which is typically 1-4 years. This property is desirable for applications which require printing inks with long shelf life, such as inkjet inks. By contrast, commercially available water soluble Cyanine NIR dyes tend to degrade rapidly in aqueous inkjet inks.

Other inks can also be present in the ink set described above, including black ink, colorless ink, e.g., fixer solutions, polymeric binders, latex overcoats, fusible material, etc., pale cyan ink, pale magenta ink, red ink, orange ink, pink ink, gray ink, green ink, purple ink, etc. These inks may also include a NIR absorbing pigment, although for black inks based on carbon black pigment, this is not typically necessary as carbon black pigment has excellent absorption in the near infrared spectrum. Further, as black is a good near infrared absorber, alignment using the black ink can be carried out by printing black indicia and color indicia (with NIR pigment present) to conduct a printhead nozzle alignment process.

Turning to other ink components that can be used, the use of visible colorants is included in accordance with embodiments of the present invention. In general, inkjet inks are either dye- or pigment-based inks. Dye-based ink-jet inks can use a soluble colorant that is usually water-based to turn the media a specific color. Insoluble dyes have also been used in ink-jet ink formulations, wherein the insoluble dyes are dispersed rather than solubilized in a liquid vehicle. Such insoluble dyes can be considered to be similar to pigmented inks, which typically disperse the colorant within the liquid vehicle. In many cases, the line quality and accuracy of plots produced by insoluble colorant-based inks can be superior to that of water-soluble colorant-based inks. However, color saturation is often superior with water-soluble dye-based ink-jet inks.

If a dye is used in the ink set of the present disclosure, almost any water-soluble acid dye(s), direct dye(s), basic dye(s), and reactive dye(s) can be used, such as those described in the Color Index. Dyes not described in the Color Index can also be used as well. Dyes can also be used that have low solubility or essentially no solubility in water or in a liquid vehicle, such as dye lakes and other known insoluble dyes. The dyes that can be used include metallized dyes and/or non-metallized dyes, depending on the specific application. If a pigment is used, any pigment colorant that is functional in accordance with embodiments of the present disclosure may be used. Types of pigments that may be used include self-dispersed pigments that include attached or adsorbed small molecules or polymers; pigments that required a separate polymer or other dispersing agent; etc. It is not the purpose of the present disclosure to describe each and every colorant or type of colorant that may be used. Any colorant or combination of colorants that impart(s) a desired color property may be used in conjunction with the NIR pigment of the present disclosure.

With respect to the liquid vehicle, the inkjet ink compositions of the present disclosure are typically prepared in an aqueous formulation or liquid vehicle which may include water, co-solvents, surfactants, buffering agents, biocides, sequestering agents, viscosity modifiers, humectants, and/or other known additives. In one aspect of the present disclosure, the liquid vehicle may comprise from about 70 wt % to about 99.9 wt % by weight of the inkjet ink composition. In another aspect, other than the colorant, the liquid vehicle may also carry polymeric binders, latex particulates, and/or other solids.

Suitable co-solvents for use in the ink set of the present disclosure include water soluble organic co-solvents, but are not limited to alcohols, ethers, thiols, ketones, aldehydes, carboxylates, amides, and amines. More specifically, exemplary co-solvents that can be used include aliphatic alcohols, aromatic alcohols, polyhydric alcohols such as diols and triols, glycol ethers, poly(glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, co-solvents may include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly (ethylene glycol) alkyl ethers, poly(propylene glycol) alkyl ethers, higher homologs of poly(propylene glycol) alkyl ethers, substituted formamides, unsubstituted formamides, substituted acetamides, and unsubstituted acetamides. More specific examples of co-solvents that may be used include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Co-solvents may be added to reduce the rate of evaporation of water in the ink-jet to minimize clogging or other properties of the ink such as viscosity, pH, surface tension, optical density, and print quality. The total co-solvent concentration can range from about 0.01 wt % to about 40 wt %. In one embodiment, the total co-solvent concentration can be from about 5 wt % to about 20 wt %, and in another, the total concentration can be from 10 wt % to 40 wt %.

In one embodiment, the inkjet inks of the present disclosure include the use of from 0.5 wt % to 8 wt % of an inorganic or organic salt. Non-limiting examples of such salts that can be used include $Mg^{2+}(NO_3)_2{}^{2-}$, $Li^+NO_3{}^-$, $K^+NO_3{}^-$, $Na^+CH_3SO_3{}^-$, $Na^+NO_3{}^-$, and/or $Mg^{2+}(CH_3SO_3)_2{}^{2-}$. Though each salt is described alone above, it is understood that each of these specific salt descriptions covers its respective hydrated salt structures as well. For example, $Mg^{2+}(NO_3)_2{}^{2-}$ would include $Mg^{2+}(NO_3)_2{}^{2-} \cdot 6H_2O$. Thus, salted inks can be printed against other inks, such as pigmented inks, to reduce bleed, as is known in the art.

Various buffering agents or pH adjusting agents can also be optionally used in the ink-jet ink compositions of the present invention. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; hydrochloric acid; and other basic or acidic components which do not substantially interfere with the bleed control or optical density characteristics of the present invention. If used, buffering agents typically comprise less than about 10 wt % of the ink-jet ink composition.

In another aspect of the present disclosure, various biocides may be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5 wt % of the ink-jet ink composition and often from about 0.1 wt % to about 0.25 wt %.

One or more of various surfactants may also be used as are known by those skilled in the art of ink formulation. Non-limiting examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, commercial products such as TERGITOLS, SURFYNOLS, ZONYLS, TRITONS, MERPOLS, and combinations thereof. The amount of surfactant added to the ink-jet ink, if any, can range from 0 wt % to 10 wt %.

The inkjet inks of the present disclosure are configured for ejection from an inkjet pen, especially a thermal inkjet pen. Thermal inkjet systems are quite different in their jetting properties than piezo inkjet systems. As such, compositions that are effective for use in piezo inkjet systems are not necessarily effective for use with thermal inkjet ink systems. However, the converse is not necessarily true. In other words, compounds that work well with thermal ink-jet systems are more likely to work with piezo systems than vice versa. Therefore, the selection of liquid vehicle or other additives for use with thermal inkjet systems often requires more care, as thermal inkjet systems are typically less forgiving than piezo inkjet systems.

The inkjet inks of the present disclosure may be printed on substrates/print medium capable of receiving such inks, including, but not limited to, papers, textile articles including fabrics, and polymeric substrates.

Another aspect of present disclosure is to provide a printing method using the novel CMY ink set disclosed herein. This method includes providing a printing system, e.g. an inkjet printer, installed with an optical sensing system, which includes an infrared light emitting diode (LED) device (illuminant) configured to emit infrared radiation that matches the spectral absorbance of the NIR pigment in the inks, i.e., emits electromagnetic light energy within the near infrared spectrum, and an infrared sensor coupled to the LED device. The sensor is capable of detecting absorbance in response to illumination by the LED. At least approximate matching between the emitted electromagnetic energy and the peak absorbance of the NIR pigment is desired, e.g., peak absorbance of the pigment within 50 nm of the infrared light energy emitted from the LED. The sensing system may be a through-page sensing system, which measures transmissive light, and in which the illuminant and the infrared sensor are positioned on opposite sides of the print medium. The sensing system may also be a reflectance-measuring system, which measures the reflected light, and in which the illuminant and the infrared sensor are positioned on the same side of the print medium.

When the inks from the CMY ink set are printed on a paper, the presence of the NIR absorbing pigment can be detected using the LED device coupled with the sensor as discussed above. The NIR absorbing pigment absorbs some portion of the emitted light from the LED. The decrease in LED intensity is detected by the sensor, which then registers the presence of the NIR pigment. By adding a sufficient amount of NIR absorbing pigment into each of the inks in the CMY ink set, a method of detection can be provided that is independent of the ink colors. When the NIR absorbing pigment is implemented in such detection method, it has been discovered that the NIR absorbing pigment can provide consistent long-term detection.

Suitable optical sensor systems that can be used can be purchased from Hewlett-Packard Company, e.g., Part No. C3195-60002 or Part No. 05302-60014, each of which can be modified by replacing the included non-infrared LED with a suitable near infrared LED. The former part is provided commercially with the HP DesignJet 755 ink-jet plotter. The latter part is provided commercially with the HP Color Copier 210 machine. These systems are typically carriage based sensors which utilize a non-infrared LED and a diffuse sensor. As stated, these parts can be readily modified by using a near infrared LED coupled with a sensor in accordance with the present disclosure.

It will be understood by those in the art that the printing system for performing the printing method described above further includes ink supply reservoirs, ink ejection mechanisms and printheads, internal electronic controller, electrical and mechanical operating mechanisms, etc., that are well known in the art for performing inkjet printing. The color inks described herein are intended to be contained in the ink supply reservoirs of the printing system.

By adding an amount of NIR pigment sufficient for detection within the colored inks using a near IR LED, a method of detecting the inks that is independent of the ink colors and works equally well across major colors of the visible spectrum can be provided, as the NIR pigment absorbs outside of the visible spectrum. When the color inks all have an effective amount of absorbing NIR pigment included therein and the NIR pigment is added at the concentration that is "visible" to a near IR LED sensor system present on a printer, the printer only requires one low cost IR LED illuminant matched to the peak absorption of the NIR pigment to "see" (i.e. detect) all of the different colors in the inks.

One useful application of the novel CMY ink set of the present disclosure is to enable the printer with multiple color pens to align the pens relative to each other. In past systems, in order for a light energy source and sensor to "see" all of the colors, expensive LED devices were used. Even with these more sophisticated LEDs, there were still trade-offs in choosing the correct LED. Further, there had been difficulty when using low colorant loads, which rendered the ink difficult or impossible to see with a light and sensor system. For example, if a blue LED is used, alignment for magenta and yellow inks is acceptable. However, the cyan response with a blue LED is very weak, and thus, cyan alignment may suffer too much variation for precise alignment.

In another application, when substantially the same concentration of NIR pigment is present in each of the colored inks within a common ink set, the printer is able to calibrate the relative drop weight between colors. This feature permits drop weight compensation in the printer which will improve image quality. For example, if the color balance between CMY or other inks is off, hue-shifts due to unbalanced drop weights can result. In other words, the printer can calibrate the relative drop weight difference between each color based on infrared absorbance and compensate the inks accordingly so that all of the pens fire the correct amount of ink. This is not possible in many current systems, as the printer must know exactly the LED wavelength (as they vary slightly), and must further know the response of a color at that wavelength. In these systems, in order to try and calibrate two colors with one LED, the LED is typically chosen at a spot where both colors absorb some light. At this location, a small change in LED wavelength greatly affects the absorption. Additionally, with a dual drop weight pen, there is a need to calibrate the relative drop weight of both the high and low drop weights. By adding a NIR pigment to each color in the ink set, the printer can then calibrate the relative difference in drop weight between the high and low drop weight pens. This process can be carried out by printing a fill image, e.g., a square or other shape, at the low drop weight, and fill images at the high drop weight depleted to different levels. By doing this, the sensor can find the correct depletion to match the original low drop weight pen. For relative drop weight differences, prior solutions included the use of a colorimeter which adds a lot of cost, or a manual color calibration which is not always acceptable and sometimes results in poor color quality.

Furthermore, a printer provided with inks containing NIR pigment can be designed to verify that all of nozzles are ejecting ink. Because the printer can see all of the color inks, the printer is able to print a series of test patterns and determine if there are missing nozzles (which show up as gaps in the pattern) or misdirected droplets (which show up as droplets of ink elsewhere on the paper other than expected). Accordingly, a correction mechanism may be incorporated to replace the misfiring or missing nozzles with good nozzles or prompt a user for cleaning the nozzles.

The presence of these NIR pigments can also allow the printer to check for counterfeit inks, and optionally, provide a message to the customer or provide some other reporting function.

For the end user of the inkjet printer, having color inks containing NIR pigment in the printer enhances the user's printing experience because the inks have a long shelf-life and the printer is provided with additional smart printing capabilities.

EXAMPLES

The following examples illustrate embodiments of the present disclosure that are presently best known and provide further detail in connection with what is presently deemed to be the most practical and preferred embodiments of the present disclosure. However, other embodiments may be practiced that are also within the scope of the present disclosure.

Example 1

Table 1 shows an exemplary ink set which includes cyan, magenta, and yellow ink formulations that incorporate the novel aspects of the present disclosure. The NIR absorbing pigment is a dispersed form of YKR5010 IR pigment with peak absorption of about 830 nm. All percentages are by weight unless otherwise indicated.

TABLE 1

| | Cyan with NIR | Magenta with NIR | Yellow with NIR |
|---|---|---|---|
| Surfynol SEF | 0.75% | 0.75% | 0.60% |
| 1-(2-Hydroxyethyl)-2-pyrrolidone | 8.00% | 8.00% | 8.00% |
| 1,6-Hexanediol | 3.00% | 3.00% | 3.00% |
| LEG-1 | 2.00% | 1.00% | 2.00% |
| Tetraethylene glycol | 3.00% | 3.00% | 3.00% |
| 2-Pyrrolidinone | 7.00% | 2.00% | 7.00% |
| Proxel GXL | 0.10% | 0.10% | 0.10% |
| Joncryl 683 (K salt) | 0.20% | 0.20% | 0.20% |
| Crodafos N-3 acid | 1.00% | 0.75% | 1.00% |
| Zonyl FSO | 0.10% | 0.10% | 0.10% |
| IJX 613L (cyan pigment) | 2.50% | | |

TABLE 1-continued

| | Cyan with NIR | Magenta with NIR | Yellow with NIR |
|---|---|---|---|
| IJX 564G (magenta pigment) | | 4.50% | |
| Projet Fast 2 Magenta Dye (Na) | | 0.45% | |
| IJX 635E (yellow pigment) | | | 3.25% |
| NIR pigment | 0.05% | 0.05% | 0.05% |
| Water | balance | balance | balance |

The peak absorbance of the color pigments are as follows: IJX 613L (cyan pigment):620 and 710 nm; IJX 564G (magenta pigment) and Projet Fast 2 Magenta Dye: 540 nm; IJX 635E (yellow pigment): 430 nm. The range of absorbance will exist for each dye surrounding the peak absorption wavelength, typically by at least 25 nm on either side of the peak absorption.

The above ink formulations were stored at 60° C. for 12 weeks. The inks were diluted 1/200 with water, the UV-Vis-NIR spectrum was recorded and absorption at 830 nm noted during the 12-week period. The results are shown in Table 2. It was observed that there was substantially no loss in absorbance at 830 nm after 12 weeks.

TABLE 2

| | Cyan | Magenta | Yellow |
|---|---|---|---|
| Week 0 | 100% | 100% | 100% |
| Week 2 | 100% | 115% | 108% |
| Week 4 | 100% | 124% | 109% |
| Week 6 | 100% | 128% | 109% |
| Week 12 | 100% | 135% | 112% |

The foregoing description of various embodiments of the present disclosure has been presented for purposes of illustration and description. It is not intended to be limited to the precise form or to exemplary embodiments disclosed. Numerous modifications and alternative compositions, methods, and systems may be devised by those skilled in the art without departing from the spirit and scope of the present disclosure. The appended claims are intended to cover such modifications and arrangements.

What is claimed is:

1. An ink set with near infrared detection capability comprising:
   a cyan ink including a cyan colorant, a magenta ink including a magenta colorant, and a yellow ink including a yellow colorant, each of the colorants having maximum light absorbance in the visible wavelength range of about 400 to 750 nm,
   in which each of the cyan, magenta and yellow inks comprises a near infrared (NIR) absorbing pigment, which is different in spectral absorption characteristic from each of the colorants and absorbs light in the wavelength range of about 750 to 1200 nm; and
   in which application of light from an LED device provides for the detection of the near infrared (NIR) absorbing pigment by the detection of a decrease in emitted LED intensity.

2. The ink set of claim 1, wherein the NIR absorbing pigment is present in each of the cyan, magenta and yellow inks in a concentration from about 0.001% to about 4.0% by weight.

3. The ink set of claim 1, wherein the NIR absorbing pigment is present in each of the cyan, magenta and yellow inks in a concentration from about 0.001% to about 1.0% by weight.

4. An ink set as in claim 1, wherein the cyan colorant, the magenta colorant, and the yellow colorant are pigments.

5. An ink set as in claim 1, wherein the cyan colorant, the magenta colorant, and the yellow colorant are dyes.

6. The ink set with near infrared detection capability of claim 1, in which a sensor detects the decrease in emitted LED intensity and in which the sensor registers the change in the intensity and a printer associated with the sensor determines if a number of color pens associated with the printer are aligned.

7. The ink set with near infrared detection capability of claim 1, in which a sensor detects the decrease in emitted LED intensity and in which the sensor registers the change in the intensity and a printer associated with the sensor determines a calibration of relative drop weights between colors ejected from a number of color pens associated with the printer.

8. The ink set with near infrared detection capability of claim 1, in which a sensor detects the decrease in emitted LED intensity and in which the sensor registers the change in the intensity and a printer associated with the sensor verifies if a number of nozzles of a print head associated with the printer are ejecting ink.

9. A method of printing comprising:
(a) providing a printing system having ink supply reservoirs, wherein said reservoirs contain a cyan ink including a cyan colorant, a magenta ink including a magenta colorant, and a yellow ink including a yellow colorant, each of the colorants having maximum light absorbance in the visible wavelength range of about 400 to 750 nm, wherein each of the cyan, magenta and yellow inks comprises a near infrared (NIR) absorbing pigment, which is different in spectral absorption characteristic from each of the colorants and absorbs light in the wavelength range of about 750 to 1200 nm;
(b) ejecting said inks onto a print medium to form a printed image;
(c) emitting infrared radiation onto the printed image using an infrared light emitting diode (LED) device, said infrared radiation matches the spectral absorbance of the NIR pigment in the ink; and
(d) detecting the presence of the NIR pigment by detecting the decrease in LED intensity.

10. The method of claim 9, wherein the cyan colorant, the magenta colorant, and the yellow colorant are pigments.

11. The method of claim 9, wherein the cyan colorant, the magenta colorant, and the yellow colorant are dyes.

12. The method of claim 11, wherein each of the cyan, magenta and yellow inks contains substantially the same concentration of NIR absorbing pigment.

13. The method of claim 9, in which detecting the presence of the NIR pigment by detecting the decrease in LED intensity provides for the printing system to determine if a number of color pens associated with the printing system are aligned.

14. The method of claim 9, in which detecting the presence of the NIR pigment by detecting the decrease in LED intensity provides for the printing system to determine a calibration of relative drop weights between colors ejected from a number of color pens associated with the printing system.

15. The method of claim 9, in which detecting the presence of the NIR pigment by detecting the decrease in LED intensity provides for the printing system to verifies if a number of nozzles of a print head associated with the printing system are ejecting ink.

16. A printing system comprising:
(a) ink supply reservoirs containing a cyan ink including a cyan colorant, a magenta ink including a magenta colorant, and a yellow ink including a yellow colorant, each of the colorants having maximum light absorbance in the visible wavelength range of about 400 to 750 nm, wherein each of the cyan, magenta and yellow inks comprises a near infrared (NIR) absorbing pigment, which is different in spectral absorption characteristic from each of the colorants and absorbs light in the wavelength range of about 750 to 1200 nm;
(b) mechanism for ejecting inks from the ink supply reservoirs onto a print medium to form a printed image;
(c) an infrared light emitting diode (LED) device configured to emit infrared radiation onto the printed image, said infrared radiation matches the spectral absorbance of the NIR pigment in the inks; and
(d) a sensor coupled to said LED device and configured to detect the presence of the NIR pigment by detecting the decrease in LED intensity.

17. The printing system of claim 16, in which detecting the presence of the NIR pigment by detecting the decrease in LED intensity causes the printing system to determine if a number of color pens associated with the printing system are aligned.

18. The printing system of claim 16, in which detecting the presence of the NIR pigment by detecting the decrease in LED intensity causes that printing system to determine a calibration of relative drop weights between colors ejected from a number of color pens associated with the printing system.

19. The printing system of claim 16, in which detecting the presence of the NIR pigment by detecting the decrease in LED intensity causes the printing system to verify if a number of nozzles of a print head associated with the printing system are ejecting ink.

* * * * *